US005107455A

United States Patent [19]

Haines et al.

[11] Patent Number: 5,107,455

[45] Date of Patent: Apr. 21, 1992

[54] REMOTE METER I/O CONFIGURATION

[75] Inventors: John G. Haines, Oakland; Tracy F. Slaughter, Grass Valley; Charles P. Barker, Pleasanton, all of Calif.

[73] Assignee: F.M.E. Corporation, Hayward, Calif.

[21] Appl. No.: 327,779

[22] Filed: Mar. 23, 1989

[51] Int. Cl.[5] .............................................. G06F 15/20

[52] U.S. Cl. ................................ 395/275; 364/949.4; 364/918.52; 364/942.6; 364/DIG. 2

[58] Field of Search ......................................... 364/900

[56] References Cited

U.S. PATENT DOCUMENTS 3,034,329 5/1962 Pitney et al. .......................... 70/314
3,654,604 4/1972 Crafton ................................ 380/23
3,792,446 2/1974 McFiggins et al. ................. 364/900
3,798,359 3/1974 Feistel .................................. 380/37
3,798,360 3/1974 Feistel .................................. 380/37
3,800,284 3/1974 Zucker et al. .................. 340/825.31
3,860,911 1/1975 Hinman et al. ................. 340/825.31
4,097,923 6/1978 Eckert, Jr. et al. ................. 364/900
4,137,564 1/1979 Spencer .............................. 364/200
4,182,933 1/1980 Rosenblum ........................... 380/21
4,222,518 9/1980 Simjian ............................... 235/375
4,226,360 10/1980 Simjian ............................... 235/375
4,249,071 2/1981 Simjian ............................... 235/375
4,253,158 2/1981 McFiggans ......................... 364/900
4,280,180 7/1981 Eckert et al. ................... 364/900 X
4,302,821 11/1981 Eckert et al. ....................... 364/900
4,310,720 1/1982 Check, Jr. ....................... 364/900 X
4,314,097 2/1982 Campbell, Jr. ................. 235/380 X
4,376,299 3/1983 Rivest ................................. 364/900
4,424,573 1/1984 Eckert, Jr. et al. ................. 364/900
4,447,890 5/1984 Duwel et al. ........................ 364/900
4,481,604 11/1984 Gilham et al. ....................... 364/900
4,484,307 11/1984 Quatse et al. ....................... 364/900
4,528,644 7/1985 Soderberg et al. ................. 364/900
4,562,535 12/1985 Vincent et al. ...................... 364/200
4,580,144 4/1986 Calvi ............................ 101/93.07 X
4,589,088 5/1986 Place ................................... 364/900
4,636,975 1/1987 Soderberg et al. ................. 364/900
4,775,246 10/1988 Edelmann et al. .................... 380/23
4,783,745 11/1988 Brookner et al. .............. 364/464.02
4,787,045 11/1988 Storace et al. ................ 364/464.02
4,812,992 3/1989 Storace et al. ................ 364/464.02
4,812,994 3/1989 Taylor et al. .................. 364/464.02
4,837,714 6/1989 Brookner et al. .................. 364/550
4,868,783 9/1989 Anderson et al. .................. 364/900

FOREIGN PATENT DOCUMENTS 2636852 2/1978 Fed. Rep. of Germany .

*Primary Examiner*—Parshotam S. Lall
*Assistant Examiner*—Edward R. Cosimano
*Attorney, Agent, or Firm*—Townsend and Townsend

[57] ABSTRACT

A technique for reconfiguring in the field external devices in communication with postage meters, the external devices having an external device feature set that may be selectively enabled or disabled by software. The technique provides security so that any changes to the feature set is authorized. The meter is capable of being put into an I/O configuration mode by suitable entries from the keyboard, in which mode it is inhibited from printing postage. The meter has a storage register for a current or old I/O configuration number (IOCN), and can receive a desired new IOCN via keyboard entry. The meter calculates an encrypted I/O configuration request code that depends on the new IOCN. The I/O configuration request code, when communicated to a data center computer along with other validating identification information, is checked by the data center computer which computes the I/O configuration request code using the same algorithm. If the two values agree, the data center computer calculates an encrypted I/O configuration enable code that depends on the meter serial number. This is communicated to the meter, which receives the I/O configuration enable code and also calculates a I/O configuration enable code using the same algorithm as the data center computer. If the I/O configuration enable codes agree, the meter overwrites the old IOCN with the new IOCN, thereby reconfiguring the meter and the external devices.

16 Claims, 5 Drawing Sheets

REMOTE METER I/O CONFIGURATION

Related copending applications include: "REMOTE METER CONFIGURATION", filed Mar. 23, 1989, Ser. No. 07/328,112; "SECURITY EXTENSION PROCEDURE FOR REMOTE SETTING METER", filed Mar. 23, 1989, Ser. No. 07/328,099; and "EMERGENCY POST OFFICE SETTING FOR REMOTE SETTING METER", filed Mar. 23, 1989, Ser. No. 07/327,487.

FIELD OF THE INVENTION

The present invention relates generally to external devices in communication with postage meters and more particularly, to reconfigurable electronic meters capable of selectively enabling controllable features of the external devices.

BACKGROUND OF THE INVENTION

With the advent of external devices such as printers, scales, and interfaces to computers in communication with electronic postage meters, it has become possible to offer meter customers a large number of optional features not possible or feasible with the meter alone. Each additional feature, however, creates a larger number of possible combinations of features. Therefore, in order for the meter company to provide a large selection of features and feature sets, it may pursue one of the following approaches:

In a first approach, the meter company may maintain a large inventory of external devices which have the various features. Although this approach has strong security, it is costly and inefficient. Furthermore, a customer wanting to change the set of features on his external devices must wait for an agent of the company to provide external devices having the desired feature set. If the agent does not have a large inventory, it becomes necessary to have external devices with the desired feature sets shipped from or built at the factory. Therefore, any attempts to reduce the number of external devices in stock will adversely affect the length of time necessary to service the customer's request.

In a second approach, the meter company may provide external devices that include all the desired features, but are disabled in some manner. Although this approach provides great flexibility, it does not provide much security. A customer may easily be able to enable unauthorized features himself by inspecting and manipulating the devices or by observing an agent enabling or disabling the desired features. Furthermore, an agent may enable the desired features without notifying the company. As a result, the company may have a large amount of lost profits due to unauthorized feature use.

SUMMARY OF THE INVENTION

The present invention provides an technique for selectively enabling features in generic external devices by reconfiguring postage meters in the field. The technique is readily implemented in the meter software, and provides security so that the meter company will always have a correct record of the external device feature set enabled by the meter in the field. This technique assumes that the external devices in communication with the meter have features that may be selectively enabled or disabled by software.

The meter is reconfigured by first putting the meter into a I/O configuration mode by suitable entries from the keyboard. In this mode, the meter is inhibited from printing postage. The meter has a storage register for a current or old I/O configuration number (IOCN). A desired new IOCN is entered via keyboard entry. The meter software generates an encrypted I/O configuration request code that is partially based on the value of the new IOCN. The I/O configuration request code is communicated to a data center computer along with other validating identification information. The data center computer checks the code by computing the I/O configuration request code using the same algorithm. If the two values agree, the data center computer generates an encrypted I/O configuration enable code that is partially based on the meter serial number. This is communicated to the meter, which receives the computer generated I/O configuration enable code and also generates an internal I/O configuration enable code using the same encryption algorithm as the data center computer. If the I/O configuration enable codes agree, the meter overwrites the old IOCN with the new IOCN in permanent storage. The external devices in communication with the meter may then read the IOCN and implement the feature set represented by the IOCN.

As a result of this technique, generic external devices may be manufactured that are capable of being configured to meet the customer's needs. Because the technique utilizes encrypted communication with the data center computer, the factory maintains control over and knowledge of the feature set of meter external devices in the field. This technique also allows the feature set to be modified at the customer site (i.e., remotely) without the presence of a company agent, thereby improving customer service.

A further understanding of the nature and advantages of the present invention can be realized by reference to the remaining portions of the specification and the attached drawings.

DETAILED DESCRIPTION OF THE SPECIFIC EMBODIMENTS

Meter and External Device Overview

Figure 1:
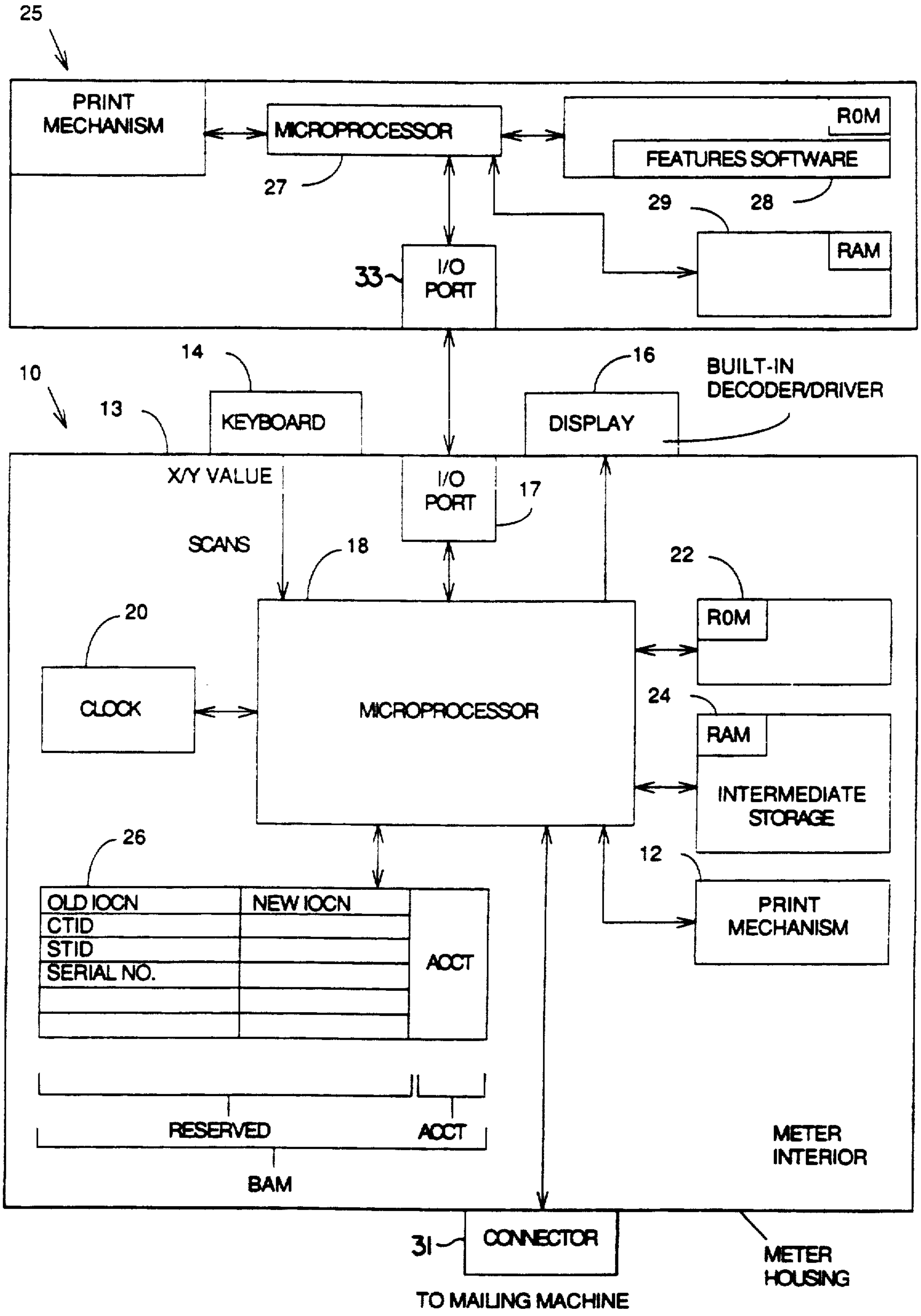
FIG. 1 is a block diagram of a preferred postage meter capable of being reconfigured in the field and an external device in communication with the meter.

FIG. 1 is a block diagram of a preferred postage meter capable of being reconfigured in the field and an external device in communication with the meter. Meter 10 includes a print mechanism 12, accounting registers, and control electronics, all enclosed within a secure meter housing 13. A keyboard 14 and a display 16 provide the user interface. An I/O port 17 provides a communications channel with external devices. The control electronics includes a digital microprocessor 18 which controls the operation of the meter, including the basic functions of printing and accounting for postage.

The microprocessor is connected to a clock 20, a read only memory (ROM) 22, a random access memory (RAM) 24, and a battery augmented memory (BAM) 26.

ROM 22 is primarily used for storing nonvolatile information such as software and data/function tables necessary to run the microprocessor. The ROM can only be changed at the factory. RAM 23 is used for intermediate storage of variables and other data during meter operation. BAM 26 is primarily used to store accounting information that must be kept when the meter is powered down. The BAM is also used for storing certain flags and other information that is necessary to the functioning of the microprocessor. Such information includes meter identifying data such as the meter serial number and BAM initialization date, and a number of parameters relevant to the remote configuration of the meter.

The meter can communicate with various external devices such as printers, scales, mailing machines (via connector 31) and computers via computer interfaces. Printer 25 is shown communicating with the meter via I/O port 33 and the meter I/O port. Microprocessor 27 controls the operation of the printer. ROM 28 is primarily used for storing nonvolatile information such as software necessary to run the printer microprocessor. RAM 29 is used for intermediate storage of variables and other data during printer operation.

Whether a feature or feature set in the printer is enabled, is controlled by an I/O configuration number (IOCN) representing the feature set enabled. In a first embodiment the IOCN is stored in meter BAM and is read by the printer microprocessor during printer power-up. The printer microprocessor then stores the IOCN in RAM. When the user requests a feature (such as the printing of an accounting report) the printer then checks the IOCN stored in RAM to see whether the feature is available. Upon receiving an affirmative reply, the printer obtains the necessary data from the meter and prints the desired report. In a second embodiment, the printer does not read the IOCN during power-up. The printer checks the IOCN stored in the meter when the user requests a feature.

Meter Relationship With the Data Center Computer

In the first and second is configured to a standard I/O feature set before leaving the factory. Because the I/O feature set is known, the meter and the external devices can be functional before the meter is registered on the data center computer. In alternative embodiments, the meter can be in a disabled state for security reasons until it has been I/O reconfigured or reconfigured (see copending application "REMOTE METER CONFIGURATION") a first time.

During the I/O reconfiguration process, the meter's serial number, present I/O configuration, and other information specific to the meter (which were already stored in the meter's memory during an initialization process at the factory) are entered on the data center computer. The meter and the computer are then to generate identical encrypted codes by using the same encryption routine and input numbers. The encrypted codes help the data center computer maintain control over the external device feature set of each meter.

The input numbers used by the meter and the computer to generate the encrypted codes are the configuration transaction identifier ("CTID") and the setting transaction identifier ("STID"). They are both specific to the meter and dependent upon the meter serial number, they may also be incremented after each use. The CTID is normally used for reconfiguring the meter and external device functions and the STID is normally used for remote setting the meter postage. Separate numbers are used for the separate procedures in order to maximize securely and minimize complexity caused by interdependence. The encryption routine using the CTID is described in greater detail below.

Meter I/O Configuration Method

Figure 2:
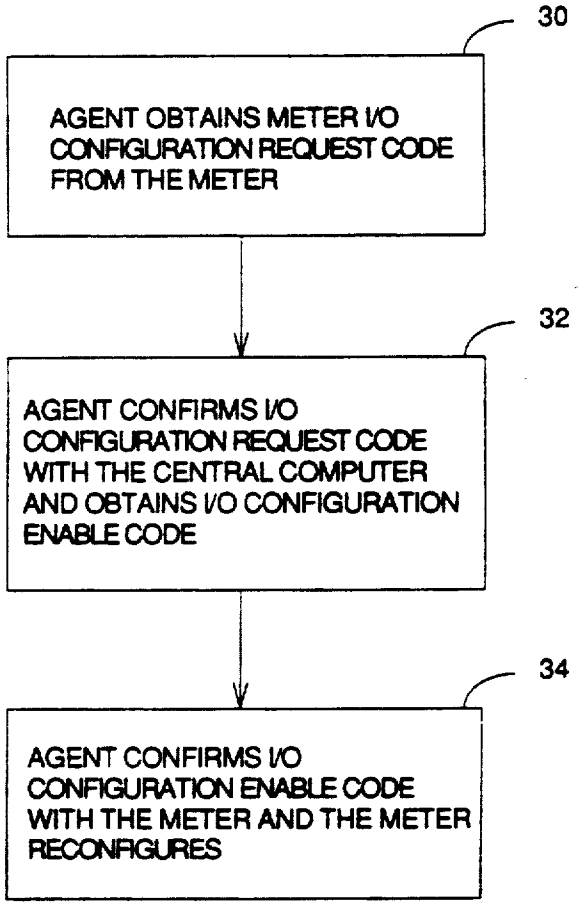
FIG. 2 is a high level flowchart of the process for reconfiguring the postage meter IOCN.

FIG. 2 is a high level flowchart of the process necessary for reconfiguring the postage meter by an agent at a customer's site or at the agent's technical service area. In a first stage 30, the agent obtains an I/O configuration request code calculated by the meter. This I/O configuration request code is essentially a password to a data center computer, and is based upon a combination of factors, the combination of which only the data center computer would know. In a second stage 32, the agent confirms the I/O configuration request code with the data center computer. Upon confirmation from the data center computer, the data center computer provides an I/O configuration enable code back to the agent. The I/O configuration enable code is essentially a password from the data center computer to the meter stating that it is permissible to reconfigure to the desired options. In a third stage 34, the agent enters the I/O configuration enable code into the meter. The meter confirms the I/O configuration enable code and reconfigures itself.

Figure 3:
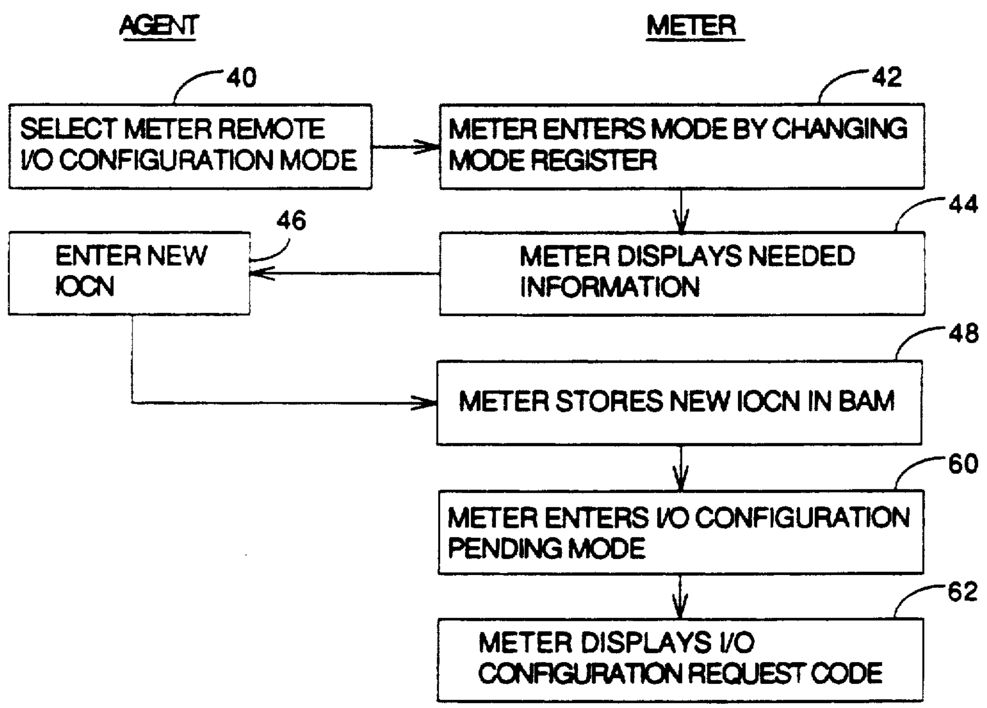
FIG. 3 is a detailed flowchart of the procedure for the agent to obtain an I/O configuration request code calculated by the meter.

FIG. 3 is a detailed flowchart of stage 30 for the first and second embodiments. Some meters have displays that are sophisticated and allow for user prompting. Therefore, in each of the steps described below where the meter requires certain information in order to move to the next step, some meters may prompt the agent to make that step.

In a first step 40, the agent puts the meter into a remote I/O configuration mode by pressing a certain key sequence and entering a service access code. The key sequence is not obvious. This prevents customers and other unauthorized personnel from accidentally entering the I/O configuration mode. The service access code is known to the agent and must be entered after completing the key sequence within a limited time interval that is scheduled by the microprocessor in continuation with the clock. Tis further prevents customers and other unauthorized personnel from entering the I/O configuration mode.

Upon entry of the predetermined key sequence and the service access code, the meter enters the remote I/O configuration mode by setting a mode register located in BAM (step 42). This prevents the meter from being used for printing purposes while being reconfigured.

In the first embodiment, the meter then displays the meter serial number and the meter BAM initialization date (step 44). The BAM initialization date is preferably a low digit number wherein the four digits YDDD express the date in which the meter was last initialized. The DDD stands for the number of days since December 31 and Y is the least significant digit of the year in which the meter was initialized.

In the second embodiment, the meter displays the above numbers and the Ascending Register amount or some other meter specific identifying information. The Ascending Register contains the amount of postage the meter has printed since the meter has been initialized.

The agent then enters the new IOCN into the meter (step 46). This new number represents the features that the external devices will have after I/O reconfiguration. The agent must then press a selected key, such as the ENTER key, followed by the service access code within a limited time interval to indicate that the entered new IOCN is correct and desired. If the entered new IOCN is incorrect or not desired, the agent may let the timer expire or press another selected key such as a CLEAR key. The agent then enters the correct new IOCN or exits the remote I/O configuration mode. Once the correct new IOCN is entered, the agent must press the selected key (i.e., ENTER) followed by the service access code within a limited time interval to indicate that it is the correct new IOCN. The meter then stores the new IOCN in BAM (step 48).

The meter then puts itself into an I/O configuration pending mode by setting a meter configuration flag located in BAM (step 60) Once in the I/O configuration pending mode, the meter must be reconfigured properly or else it will not return to the print mode. This prevents unauthorized tampering with the reconfiguring of the meter. The meter remains in this mode even when the meter is turned off and then turned back on.

The meter then generates and displays an encrypted meter I/O configuration request code (step 62). In the first embodiment, the I/O configuration request code is practically based on the CTID and the new IOCN. In the second embodiment, the I/O configuration request code is partially based on the Ascending register amount, the CTID, and the new IOCN. The encryption process for doing so is described in further detail below.

Figure 4:
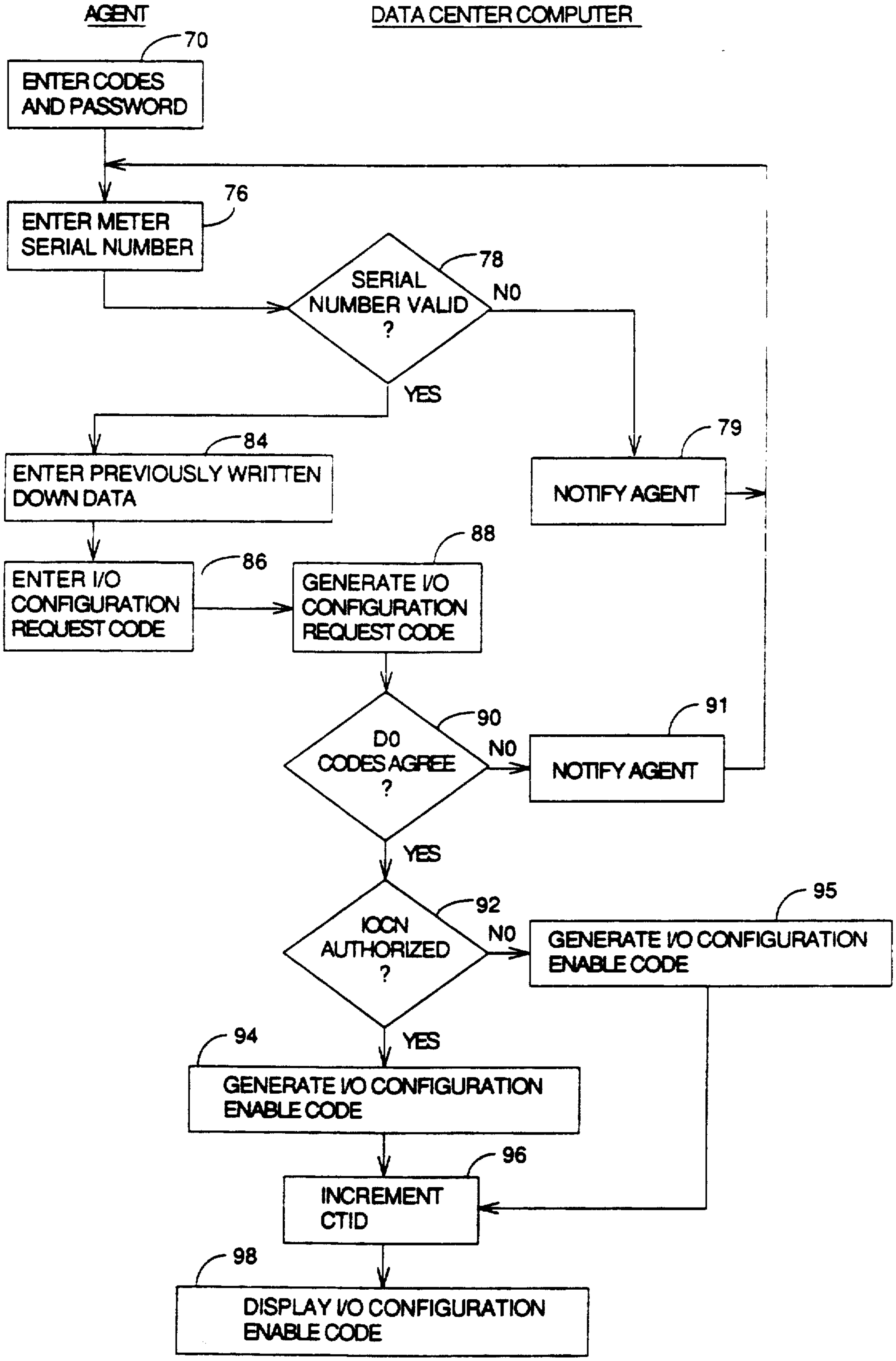
FIG. 4 is a detailed flowchart of the procedure for the agent to confirm the I/O configuration request code with the data center computer.

FIG. 4 is a flowchart of stage 32 as shown in FIG. 2 for the first and second embodiments. The agent establishes communication with the data center computer over a standard telephone. In a first and second embodiments, the agent may communicate with the data center computer on a touchtone telephone by pressing the keys. Alternative embodiments may utilize a telephone communications device that includes a user or meter interface and a modem, or by voice recognition over a telephone.

The agent first enters various codes and a password to the computer (step 70). These include a transaction code (which describes that the agent is attempting to do a remote I/O configuration for a meter). The agent's employee number, and the agent's authorization code (which is a password to the data center computer for that employee).

The agent then enters the meter serial number which was previously displayed by the meter but can also be found on the exterior of the meter (step 76). If the data center computer determines that the serial number is within a valid range (step 78), then the user may continue to step 84. Otherwise, the computer will notify the agent that the serial number is not within a valid range (step 79) and the agent must reenter the serial number or terminate the transaction.

Assuming that the serial number is valid (yes at step 78), the agent then enters data previously obtained and written down (step 84). In the first embodiment, this includes the BAM initialization date and the new IOCN. In the second embodiment, this includes the BAM initialization date, the new IOCN, and the Ascending Register amount.

The agent then enters the I/O configuration request code (step 86) which was also obtained above from the meter (in step 62). From this information, the computer is able to generate an I/O configuration request code (step 88). The computer checks that its generated I/O configuration request code matches the I/O configuration request code generated by the meter (step 90). If they do not match, then the agent has improperly entered numbers, the meter has been improperly reconfigured, or some other error has occurred. The agent is then notified (step 91) and must repeat the above steps starting with entering the meter serial number (step 76) or terminate the transaction.

If the two codes match, then the computer determines whether the requested IOCN is authorized for the customer (step 92). If it is authorized, then the computer generates an encrypted I/O configuration enable code using a current high security length ("HSL") value and a status code stating that the IOCN is authorized (step 94) and increments the CTID (step 96). The HSL value is a level of security presently utilized by the meter and data center computer which affects the length of codes passed between the meter and the data center computer (see encryption routine below and Appendix A). If the IOCN is not authorized, then the computer generates an encrypted I/O configuration enable code also, using the current HSL value and a status code stating that the IOCN is not authorized (step 95). The encryption process for doing so is described in further detail below. The data center computer then increments a counter called the configuration transaction identifier (CTID) located within the computer (step 96). The computer then displays the generated I/O configuration enable code (step 98).

Figure 5:
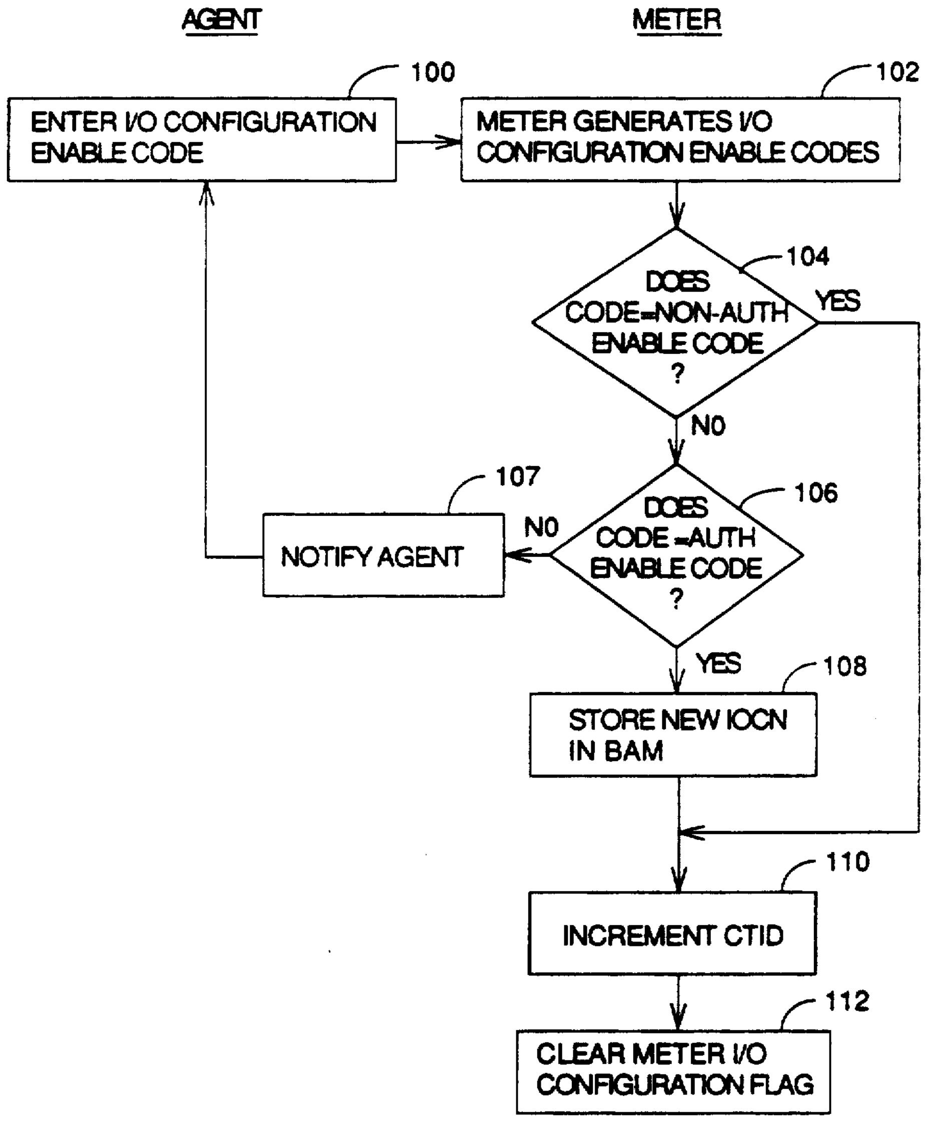
FIG. 5 is a detailed flowchart of the procedure for the agent to enter the I/O configuration enable code into the meter.

FIG. 5 is a flow chart of stage 34 shown above in FIG. 2. The agent enters the appended computer generated HSL value and I/O configuration enable code into the meter (step 100). The meter then generates two I/O configuration enable codes (step 102) using the appended HSL value, one which indicated the IOCN is authorized, the other indicating that the IOCN is not authorized. If the computer generated enable code does not equal either code (steps 104 and 106), then the agent is notified (step 107) and is asked to reenter the computer generated I/O configuration enable code. If the computer generated I/O configuration enable code equals the meter generated enable code indicating that the IOCN is authorized, then the new IOCN replaces the old IOCN in BAM (step 108). If the computer generated enable code equals either of the meter generated enable codes, then the CTID is incremented (step 110) and the meter I/O configuration pending flag is cleared (step 112), thereby allowing the meter to return from the I/O configuration pending mode to the print mode.

Encryption Technique

In order to perform the above procedure in a secure manner and to confirm certain data, the I/O configuration request code and the configuration enable code are generated by an encryption routine, stored both in the meter ROM and the data center computer. The encryption routine is a nonlinear algorithm that generates a number that is apparently random to an outside person. The encryption routine is performed by an encryption program in combination with a permanent encryption table. In the first and second embodiments, the encryption routine uses a 16 digit (or 64 bit) key and a 16 digit input number.

In the first embodiment, the I/O configuration request code is generated by the encryption routine performed on the CTID as the key and the IOCN as the input number. In the second embodiment, the key is composed of the Ascending Register amount and the IOCN as the input number.

In the first embodiment, the I/O configuration enable code is generated by the encryption routine performed on the CTID as the key and a combination of the meter serial number, status code, and HSL value as the input number. In the second embodiment, the I/O configuration enable code is generated by the encryption routine performed on the CTID as the key and a combination of the Ascending Register amount, meter serial number, and status code as the input number.

The CTID is a 16 digit number that is stored in BAM. The initial value of the CTID is obtained by performing an algorithm upon the BAM initialization date in combination with the meter serial number. The BAM initialization date is used to prevent starting with the same CTID every time the meter is initialized. The algorithm is not stored in the meter for security reasons. The initial CTID is stored in BAM during the initialization process at the factory. After the meter is I/O reconfigured, the CTID is incremented by a nonlinear algorithm within the meter.

The codes generated by the encryption routine are 16 digits long. The lower digits of the codes are then communicated to the agent by the meter or the data center computer. The number of lower digits that are communicated is determined by the HSL value (see Appendix A).

Conclusion

It can be seen that the present invention provides a secure and efficient technique for allowing meters to be reconfigured in the field. The meter customer has the option of selecting features or feature sets while the meter company is spared the burden of maintaining a huge inventory that would otherwise be necessary or using a less secure system.

While the above is a complete description of specific embodiments of the invention, various modifications, alternative constructions, and equivalents may be used. For example, the electronics of the configurable meter may be structured differently. Additionally, instead of using the tones on the telephone, a direct connection via modem can be used. Furthermore, the encryption key used to generate the meter request codes could be composed of a meter cycle counter instead of the Ascending Register Amount. Other security measures may be implemented such as requiring periodic inspection of the meter.

Therefore, the above description and illustration should not be taken as limiting the scope of the present invention, which is defined by the appended claims.

APPENDIX A

Variable Length Security Codes

An algorithm is used to generate an apparently random code with multiple digits. However, only a selected number of digits (usually the lower digits) of this code needs to be used in most applications. The number of digits needed depends upon the level of security needed. It is preferred to use as few digits as possible to decrease the number of keystrokes that must be entered, thereby increasing convenience and decreasing the potential for error.

As a result, a variable has been created which defines the overall level of security required by the meter or data center computer. This variable is called the high security length (HSL) value.

Each code generated by the meter or data center computer has a variable length of digits used depending upon the HSL value. That is, if the HSL value is 1, then the I/O configuration request code should have 6 digits. If the HSL value is higher, then the I/O configuration request code should be longer. Other codes may have different lengths for a given HSL value, but each code will increase or decrease in length if the HSL value is increased or decreased.

This predetermined relationship between code length and the HSL value allows the meter manufacturer to increase or decrease security for the meter without having to recover and initialize each meter. Changes in the HSL value are communicated to the meter when performing a remote meter I/O configuration.

In an alternative embodiment, multiple security variables may be used to vary the lengths of individual or groups of codes without affecting the length of the remaining codes.

What is claimed is:

1. A method of selectively enabling software controllable features of an external device, the external device determining which features are to be enabled by inquiring an electrically coupled reconfigurable meter, the meter having identifying data stored therein, being remote from a data center computer, and having a first mode of operation wherein the meter can print postage and be used with the enabling features and a second mode of operation for altering the selected controllable features, the method comprising the steps of:

a) placing the meter in the second mode;

b) entering into the meter a new I/O configuration number representing a desired external device feature set to be enabled;

c) calculating at the meter a meter generated I/O configuration enable code that depends on the identifying data and the new I/O configuration number;

d) establishing communication with the data center computer;

e) entering into the data center computer the identifying data and the new I/O configuration number;

f) calculating at the data center computer a computer generated I/O configuration enable code;

g) entering the computer generated I/O configuration enable code into the meter;

h) comparing at the meter, the meter generated I/O configuration enable code and the computer generated I/O configuration enable code;

i) if the meter generated and computer generated I/O configuration enable codes correlate, placing the meter in the first mode; and j) in response to said placing the meter in the first mode, causing the meter to alter the feature set of the external device.

2. The method of claim 1, wherein the step of entering a new I/O configuration number is provided by the steps of:

k) calculating at the meter a meter generated I/O configuration request code;

l) entering the meter generated I/O configuration request code into the data center computer;

m) calculating at the data center computer a computer generated I/O configuration request code; and n) comparing at the date center computer the meter generated and computer generated I/O configuration request codes.

3. A postage meter, said postage meter capable of interfacing to an external device having software features that may be selectively enabled, the external device inquiring said postage meter to determine which software features are enabled, said postage meter comprising:

a) first register means for storing a first number representative of a current external device feature set;
b) means for communicating the current feature set represented by the content of the first register means to the external device;
c) second register means for storing an entered second number representative of a desired new external device feature set;
d) means for generating an external I/O configuration enable code that depends on at least one of the first and second numbers;
e) means for entering an externally generated I/O configuration enable code, said externally generated I/O configuration enable code being generated at a remote data center;
f) means for comparing the internally generated I/O configuration enable code with the entered externally generated I/O configuration enable code; and
g) means for placing the second number in the first register means when the internally generated and entered externally generated I/O configuration enable codes are the same.

4. The meter of claim 3, and further comprising means for generating and displaying an I/O configuration request code that depends on at least one of the first and second numbers.

5. The meter of claim 3 wherein the I/O configuration enable codes are encrypted.

6. A postage meter, said postage meter capable of interfacing to an external device having software features that may be selectively enabled, the external device inquiring said postage meter to determine which software features are enabled, said postage meter comprising:

a) first register means for storing a first number representative of a current external device feature set;
b) means for communicating the current feature set represented by the content of the first register means to the external device;
c) second register means for storing an entered second number representative of a desired new external device feature set;
d) means for generating an internal I/O configuration enable code that depends on at least one of the first and second numbers;
e) means for entering an externally generated I/O configuration enable code, said externally generated I/O configuration enable code being generated at a remote data center;
f) means for comparing the internally generated I/O configuration enable code with the entered externally generated I/O configuration enable code; and
g) means for placing the second number in the first register means when the internally generated and entered externally generated I/O configuration enable codes are the same, and wherein the I/O configuration enable codes depend on a current high security length value and a status code.

7. A postage meter, said postage meter capable of interfacing to an external device having software features that may be selectively enabled, the external device inquiring said postage meter to determine which software features are enabled comprising:

a) first register means for storing a first number representative of a current external device feature set;
b) second register means for storing an entered second number representative of a desired new external device feature set;
c) first means for entering an externally generated I/O configuration enable code that depends on at least one of the first and second numbers, said externally generated code from a remote data center;
d) second means at the meter for:
   i) generating an internal I/O configuration enable code;
   ii) comparing the internally generated I/O configuration enable code with the entered I/O configuration enable code;
   iii) placing the second number in the first register means when the internally generated and entered I/O configuration enable codes are the same; and
   iv) communicating the feature set represented by the content of said first register means to the external device.

8. The meter of claim 7 wherein the second means is further for generating and displaying an I/O configuration request code that depends on at least one of the first and second numbers.

9. The meter of claim 7 wherein the I/O configuration enable code is encrypted.

10. The meter of claim 7 wherein the second means is a programmed digital microprocessor.

11. A postage meter, said postage meter capable of interfacing to an external device having software features that may be selectively enabled, the external device inquiring said postage meter to determine which software features are enabled comprising:

a) first register means for storing a first number representative of a current external device feature set;
b) second register means for storing an entered second number representative of a desired new external device feature set;
c) first means for entering an externally generated I/O configuration enable code that depends on at least one of the first and second numbers and wherein said I/O configuration enable code depends on a current high security length value and a status code, said externally generated code from a remote data center;
d) second means at the meter for:
   i) generating an internal I/O configuration enable code;
   ii) comparing the internally generally I/O configuration enable code with the entered I/O configuration enable code;
   iii) placing the second number in the first register means when the internally generated and entered I/O configuration enable codes are the same; and
   iv) communicating the feature set represented by the content of said first register means to the external device.

12. A postage meter system, said postage meter capable of interfacing to an external device having software features that may be selectively enabled, the external device inquiring said postage meter to determine which software features are enabled, said postage meter comprising:

a) a mode register having at least a first state and a second state;

b) means, responsive to the state of the mode register, for controlling normal meter operations;

c) a first register for storing an old I/O configuration number representative of a current external device feature set of the meter;

d) means for communicating the feature set represented by the content of the first register to the external device;

e) means, responsive to a particular first data entry, for setting the mode register to the second state;

f) a second register for storing a new I/O configuration number representative of a desired new external device feature set;

g) means, responsive to a second data entry representing the desired new feature set, for placing said new I/O configuration number in the second register;

h) means for generating a meter generated configuration request code;

i) means at a remote data center for calculating an encrypted internally generated configuration request code whose value depends on the new I/O configuration number and a second number;

j) means for comparing said encrypted internally generated configuration request code and said meter generated configuration request code, and if they correlate, means for generating an externally generated I/O configuration enable code;

k) means for calculating an encrypted internally generated I/O configuration enable code whose value depends in a different way on the I/O configuration number and the second number;

l) means, responsive to a third data entry representing the externally generated I/O configuration enable code, for comparing the internally generated and externally generated I/O configuration enable codes; and m) validation means, responsive to a predetermined relationship between the internally generated and externally generated I/O configuration codes for storing the new I/O configuration number in the first register, the validation means acting further to set the mode register to the first state.

13. The meter of claim 12, and further comprising:

n) means for incrementing a CTID each time the validation means determines the existence of the predetermined relationship.

14. The meter of claim 13 wherein the encrypted configuration enable code is partially dependent upon the CTID.

15. The meter of claim 13 wherein the encrypted configuration request code is partially dependent upon the CTID.

16. The meter of claim 13 wherein the encrypted configuration request code is not dependent upon the CTID.

* * * * *